United States Patent [19]
Souparis et al.

[11] Patent Number: 5,808,776
[45] Date of Patent: Sep. 15, 1998

[54] PROCESS FOR REALIZATION OF AN OPTICALLY VARIABLE IMAGE

[75] Inventors: Hugues Souparis, Nogent-Sur-Marne; Françoise Daniel, Paris, both of France

[73] Assignee: Hologram Industries, S.A., Fontenay-Sous-Bois, France

[21] Appl. No.: 535,292
[22] PCT Filed: Mar. 3, 1995
[86] PCT No.: PCT/FR95/00255
  § 371 Date: Feb. 15, 1996
  § 102(e) Date: Feb. 15, 1996
[87] PCT Pub. No.: WO95/23986
  PCT Pub. Date: Sep. 8, 1995

[30] Foreign Application Priority Data

Mar. 3, 1994 [FR] France ................................. 94/02453

[51] Int. Cl.⁶ .......................... G02B 26/00; B42D 15/00
[52] U.S. Cl. .............................. 359/237; 359/15; 359/22; 283/86
[58] Field of Search ................................ 359/237, 15, 22, 359/24, 30, 900; 283/91, 94, 86

[56] References Cited

U.S. PATENT DOCUMENTS

| | | |
|---|---|---|
| 4,364,627 | 12/1982 | Haines . |
| 4,568,141 | 2/1986 | Antes ..................................... 350/3.61 |
| 4,589,686 | 5/1986 | McGrew .................................. 283/85 |
| 4,717,221 | 1/1988 | McGrew ................................. 350/8.7 |
| 5,282,066 | 1/1994 | Yu et al. ..................................... 359/3 |
| 5,471,328 | 11/1995 | Wreede ..................................... 359/22 |
| 5,483,363 | 1/1996 | Holmes et al. ............................ 359/2 |
| 5,486,933 | 1/1996 | Shinda et al. ............................. 359/2 |

FOREIGN PATENT DOCUMENTS

| | | |
|---|---|---|
| 0105099 | 4/1984 | European Pat. Off. . |
| 0240261 | 10/1987 | European Pat. Off. . |
| 0247471 | 12/1987 | European Pat. Off. . |
| 0251815 | 1/1988 | European Pat. Off. . |
| WO8201595 | 5/1982 | WIPO . |
| WO8204327 | 12/1982 | WIPO . |

*Primary Examiner*—Mark Hellner
*Attorney, Agent, or Firm*—Weiser and Associates, P.C.

[57] ABSTRACT

Method for the production of an optically variable image including an animated element used as the model for the reproduction of a security element, by insolation of a light-sensitive material through two coherent light beams. The image is broken down into a plurality of elementary images, each corresponding to an optical effect defined by a color, the time when the image elements appear and their duration. A plurality of masks is provided, each including a number of windows defining an elementary image. Two light beams are used to light the entire substrate surface and the substrate is isolated by successively placing each mask on the substrate and in the path of the light beams. The first light beam is stationary while the second light beam is emitted from an illumination surface with adjustable dimensions and position, so as to produce a given optical effect for each elementary image.

38 Claims, 5 Drawing Sheets

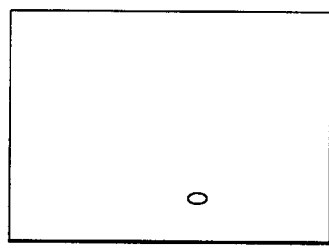
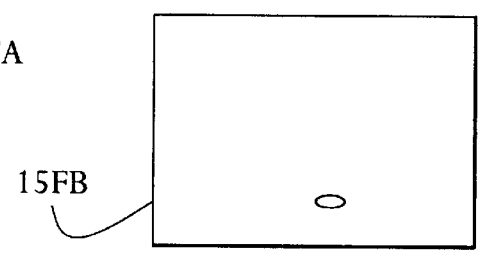
FIG. 6A FIG. 6B
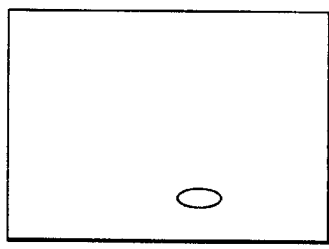
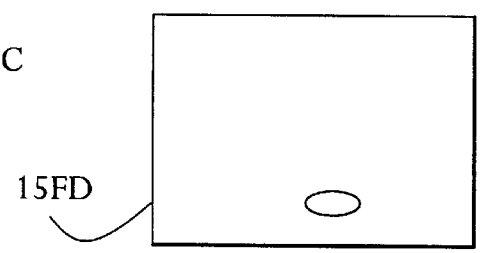
FIG. 6C FIG. 6D
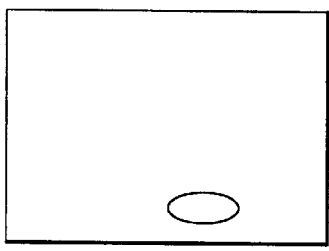
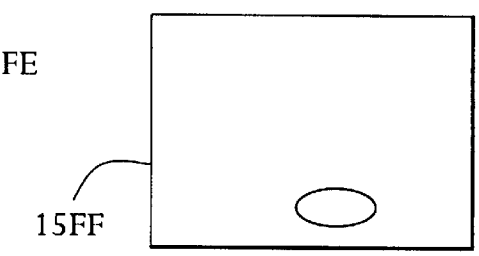
FIG. 6E FIG. 6F
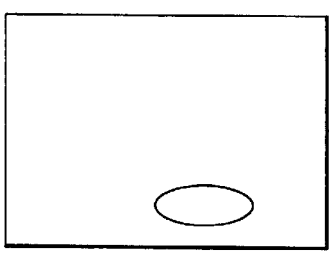
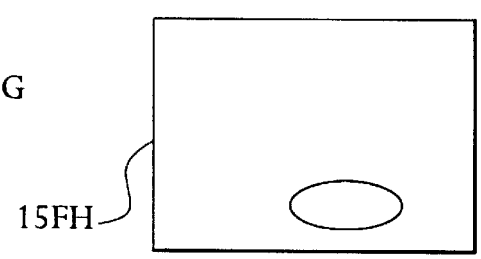
FIG. 6G FIG. 6H

PROCESS FOR REALIZATION OF AN OPTICALLY VARIABLE IMAGE

BACKGROUND OF THE INVENTION

1. Field of the Invention

The present invention concerns a process for realization of an optically variable image serving as the model for reproducing a security element on a document, by insolation of a photosensitive substrate with the aid of two coherent bundles of light.

2. Description of the Related Art

"Optically variable image" is understood to mean an image such that the retinal impressions of an observer vary when, with the observer being immobile and the light source fixed, the document bearing the security element pivots around a vertical axis or a reference axis which is fixed relative to the document.

In the area of security, the most interesting effects are those connected to the variability of grids. Such variability is expressed either by variations in colors or by the appearance and disappearance of juxtaposed elements leading to the effect of animated images obtained by playing upon the directivity of the diffractive light either by pivoting the document around a geometric vertical axis or rocking it along a reference axis of the document.

Among the possible variations of the image as perceived by the observer are the following:

- changes in color, with colors ranging from pure colors to composite colors, the rendering of pure colors and the achromatic;
- transitory, intermittent, or constant appearance of certain elements of the image, allowing, for example, the creation of the effect of animation of one or several parts of the image.

Elements of optical security are used on documents such as bank cards, credit cards, identification papers, or documents having a fiduciary value in order to prevent their falsification.

Historically, the first optical element to be used was the hologram, the product of a technology which allowed the reproduction of images in relief and true colors. However, that technology is very widespread and thus is not well adapted to security documents.

The stereogram is the tridimensional holographic image which is the most complex to elaborate. It is a high level security protection allowing objects, persons, scenes in relief, or three dimensional synthetic images to be recorded. However, under ordinary lighting, the rendering of tridimensional holographic images does not allow perfect verification of the image.

Thus, under certain circumstances, the authentication of high security documents loses its accuracy. EP-A-0 467 601 describes a process for the realization of a holograph by the insolation of a substrate. Insolation of the substrate according to the process described in that document is realized point by point by focusing two bundles of light, and the substrate is moved in increments from the abscissa to the ordinate. The size of the point to be insolated is limited by a mask which has a punctiform opening. The accuracy of the realized image is a function of the size of the pixels and the precision of the incremental movements from the abscissa to the ordinate. The angular arrangement of the bundles of light should be synchronized with the displacement of the substrate. This process does not make it possible to obtain with great accuracy images which consist of fine lines where the desire is for each line to be totally visible or invisible intermittently in the eyes of an observer viewing the image.

EP-A-0 105 099 describes another process for manufacturing an image in which a series of three diaphragms whose relative position can be varied is used, whereby two of the diaphragms make it possible to generate two punctiform sources while masking a larger source. The two punctiform sources are coherent with each other and make it possible to illuminate the entire sensitive surface upon which the optically variable image is to be realized. The third diaphragm makes it possible to isolate a small element of the sensitive surface. Displacement of the first two diaphragms in relation to each other and by rotation around an axis perpendicular to the substrate to be insolated makes it possible to define the interferential structure of the grid, that is, the spatial frequency and angular orientation of the striations on the grid. Displacement of the third diaphragm makes it possible to inscribe the grid at the desired location on the substrate. This process requires that the means of displacing the first two diaphragms and the means of displacing the third diaphragm be synchronized. In addition, the fineness of the image is a function of the size of the opening in the third screen. This process has the same drawbacks as those mentioned for EP-A-0 467 601.

In the two documents cited above, recording of the grid on each pixel is accomplished on the basis of two punctiform sources. These processes lead to a transitory image when the observer moves the document to and fro.

Whatever technology is utilized, the definition of the resulting image is limited, be it by the size of the pixels, by the size of the flecks of light when the latter are generated by fibers, by the mechanical fineness of the system used for realization of the pixels, or by the size of the blocking diaphragm.

Furthermore, these technologies do not allow realization of images which are large in format, covering the entire document to be secured.

SUMMARY OF THE INVENTION

WO-A-82 01595 concerns a process for the realization of colorized and textured effects on a surface by making use of masks which have apertures of a very large size or windows of large dimension. This process does not make it possible to obtain optically variable images which include animation.

The goal of the present invention is to propose a process for the realization of an optically variable image by insolation of a substrate which allows mastery of the time and duration of the appearance of a transitory image and mastery of the passing chromatic band when one observes the image while causing its support to pivot around a reference axis of the document which guarantees precise control of the size of the points, lines, and surfaces forming the image regardless of the complexity of the grids to be inscribed on the substrate, and which is simple to implement.

The invention achieves its goal by the process characterized by the fact that said optically variable image is broken down into at least six elemental significative images affected by a determined optical effect, said optical effect being defined, for the observer who moves said document to and fro, by a color, a passing chromatic band, and a time and duration of the appearance of said elemental image, and being such that the determined optical effects of said elemental images define a speed of animation for said optically variable image when the observer moves said document back and forth around a vertical, horizontal, or perpendicular axis of said document, and by the fact that in order to realize each elemental image on the substrate, one utilizes a mask comprised of an arrangement of windows defining the substrate into zones, upon which said elemental image is impressed, and by the fact that one utilizes a first punctiform bundle of light capable of illuminating the entire surface of the substrate and a second bundle of light emitted by an illuminating surface each illuminating element of which is capable of illuminating the entire surface of the substrate, said illuminating surface having adjustable dimensions and adjustable positioning relative to said first bundle of light, and by the fact that the substrate is insolated by placing each mask successively over the substrate and in said bundles of light and by first adjusting, prior to each insolation, the position and dimensions of the illuminating surface so as to obtain the determined optical effect for the elemental image corresponding to each mask.

The preferred illuminating surface has the overall shape of a rectangle. Adjustment of its height assures mastery of duration of the appearance of the image, and adjustment of its width assures mastery of the passing chromatic band.

The width and height are defined in the following manner. The width is the dimension of the illuminating surface measured in a direction which is parallel to the general plane defined by the two bundles of light, which is itself parallel, for example, to the top/bottom direction of the image. The height is the dimension of the illuminating surface measured on a plane which is perpendicular to the general plane defined by the two bundles of light. This height is parallel to the horizontal of the image.

Prior to realization of the masks, the global image is broken down into homogeneous subsets, reasoning in terms of optical effects. This decomposition can be realized by any means, notably by computerized means of image processing. The windows on the masks may have varied dimensions and shapes. They may exist in the form of points, lines, surfaces, bars, or sets of lines.

It is permissible for portions of the windows on several masks to overlap.

The zones of the substrate which are supposed to represent natural colors in a given position of observation, that is, at a given moment of the animation around the horizontal axis of the security element, are broken down into the three basic colors red, green, and blue, and give way to three different masks whose windows have apertures varying with the intensity of each color.

The proposed process allows insolation as a function of the selected mask either of a very small surface or a very large surface. Notably, it makes it possible to inscribe easily and with great accuracy micro-lettering or very line lines on the substrate.

The number of masks is a function of the complexity of the desired optically variable image and the desired animation effect. For an animated image, the preferred number of masks is at least six.

In addition, the following devices are adopted to good advantage:

The angular positioning of the unit comprised of both the substrate and the mask around an axis perpendicular to said unit as a function of the mask;

The first bundle of light is fixed for the entire series of insolations, and the second bundle of light is positioned as a function of the mask;

To generate the second bundle of light, one utilizes a divergent bundle of light issuing from a laser, a first transversely and axially mobile cylindrical lens located in said divergent bundle of light, a second transversely and axially mobile cylindrical lens located in the bundle of light issuing from said first lens at right angles to said first lens, and a fixed holographic optical element located in the bundle of light issuing from said second lens whose every element illuminates the entire unit comprised of the substrate and the mask.

Displacing one or the other of said lenses makes it possible to modify the dimensions of the illuminating surface and the angles of incidence of the light rays in the second bundle of light.

BRIEF DESCRIPTION OF THE DRAWINGS

Other advantages and characteristics of the invention follow from a reading of the description below which serves as an example and refers to the drawings in the appendix wherein:

FIGS. 6A through 6H show the masks for realization of the animated lines.

DETAILED DESCRIPTION

Figure 1:
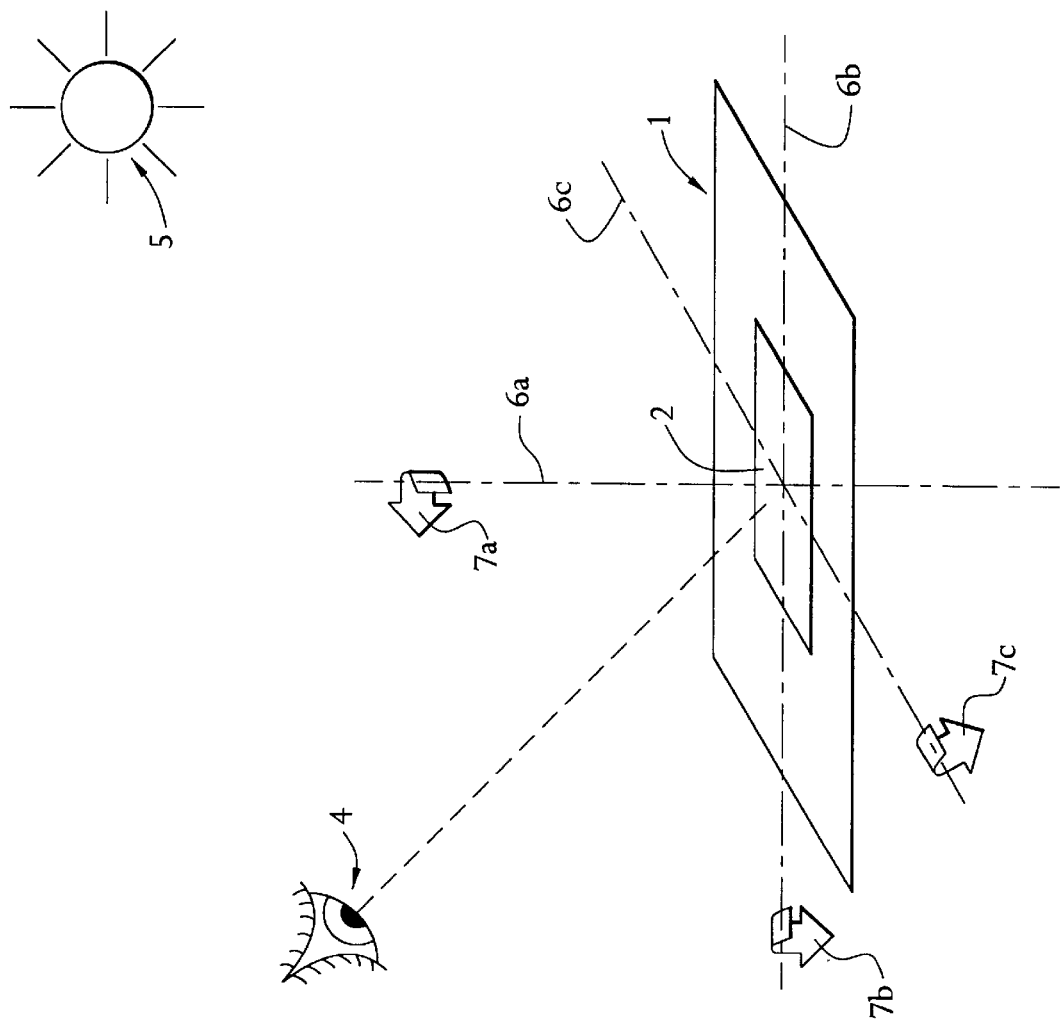
FIG. 1 shows a document equipped with a rectangular shaped security element located at its center.

FIG. 1 shows a document 1 to which is affixed a security element 2 comprising an optically variable image, that is, the eye of an observer regarding the security element 2 illuminated by a fixed source of light 5 perceives an image whose colors or shapes vary when the document is caused to turn around an axis 6a perpendicular to the surface of the security element 2, or when the document is moved to and fro around one of the reference axes, top-bottom 6b or right-left 6c, belonging to the plane of the document 1. Movements imprinted on the document 1 are shown by the arrows 7a, 7b, and 7c, respectively. Movement of the document 1 to and fro around the axis 6b makes it possible to globally vary the different colors of the image. Movement of the document 1 to and fro around the axis 6c allows the transitory or prolonged appearance and disappearance of the various elements of the image. Thus, one can follow the course of an image (animation effect).

The security element 2 may be obtained, for example, by die stamping of a polyester film overlaid on its face made visible by a layer of material which reflects light received, using a rigid punching die whose impression is the complement of the impression of a model obtained by insolation of a photosensitive substrate 8. The purpose of the present invention is to propose a process for realization of all optically variable image on the substrate 8.

Figure 2:
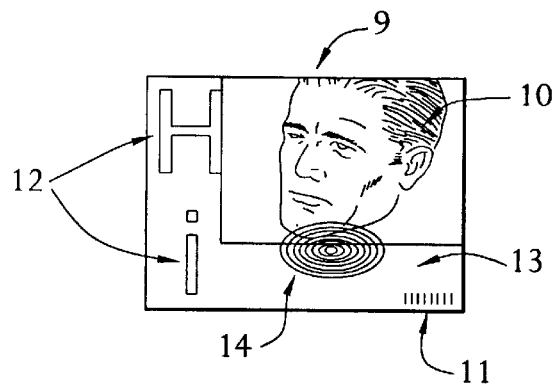
FIG. 2 shows by way of an example, a security element which comprises an image in true or natural colors with flat tints, animated lines, and micro-lettering.

FIG. 2 shows an example of the desired image 9 on the security element 2.

This image 9 comprises a photograph 10 in natural colors, a zone 11 with micro-lettering, flat tint areas of monochromatic color representing the letters H I, and a zone 13 consisting of a multitude of concentric elliptical lines 14. When a quasi-punctiform source 5 emits light, these elliptical lines 14 are not all simultaneously visible to the observer. When the observer moves the document 1 to and fro or turns it, these lines 14 are visible in succession, imparting the effect of animation to the image, with the diameter of the oval perceived as waxing or waning in a continuous manner.

In order to accomplish the image 9 shown in FIG. 2, this image is broken down into a multitude of elemental images each of which corresponds to a determined optical effect, and masks 15 equal in number to the optical effects are fashioned. Each mask comprises only one part of the total image. Each mask 15 has at least one window 16 corresponding to a zone to be insolated satisfactory to the desired optical effect. The photograph 10 is analyzed point by point as a function of the three basic colors red, green, and blue, and for each basic color one mask 15 is created.

Figure 3A:
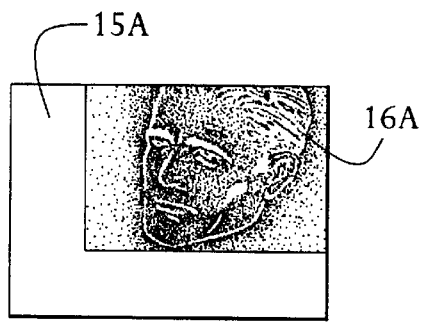
FIGS. 3A through 3C show the three masks needed to realize the image in true color shown in FIG. 2, where FIG. 3A corresponds to the mask for the color red, FIG. 3B corresponds to the mask for the color green, and FIG. 3C corresponds to the mask for the color blue.
Figure 3B:
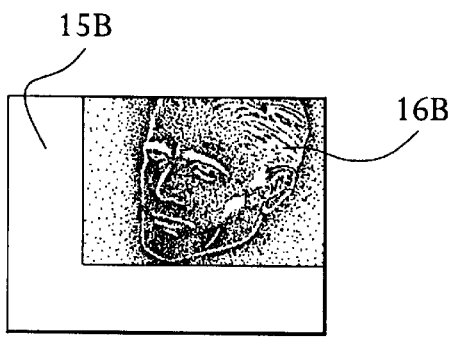
Figure 3C:
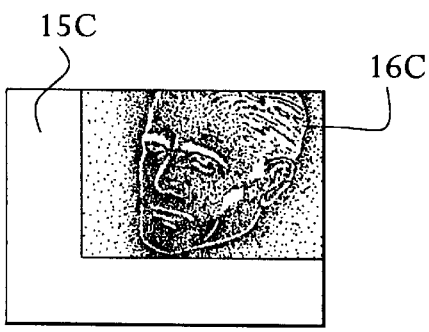

The masks 15A, 15B, and 15C shown in FIGS. 3A, 3B, and 3C have the respective windows 16A, 16B, and 16C needed in order to reproduce the basic colors red, green, and blue in the photograph 10.

Figure 4:
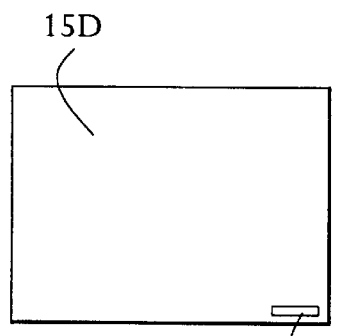
FIG. 4 shows the mask for realization of the micro-lettering in FIG. 2.

The mask 15D shown in FIG. 4 also has a multitude of small windows 16D representing the micro-lettering in the zone 11.

Figure 5:
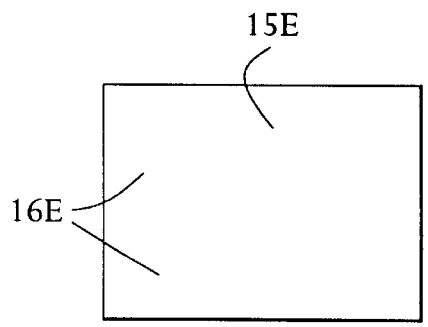
FIG. 5 shows the mask for realization of a flat tint in FIG. 2.

The mask 15E in FIG. 5 has two windows 16E shaped like the letters H and I respectively of the flat tints 12 in FIG. 2.

FIGS. 6A and 6F each show a mask 15 having a window 16 shaped like an elliptical line. The size of the oval will increase continuously from the mask 15FA shown in FIG. 6A to the mask 15FH shown in FIG. 6H.

In FIGS. 3A through 6G, the zones of the mask which are opaque to light are indicated by the color gray. In FIGS. 6A through 6H the zones which let the light pass through are delineated by heavy lines.

There may be any number of windows 16 on each mask 15. In addition, each window 16 may be very small in size or have a very large surface and may take any shape.

What matters is that the windows 16 of a given mask 15 correspond to an elemental image associated with a determined optical effect. That is to say, that when moving the document 1 back and forth while looking at it, an observer will see the elemental image corresponding to that mask under a given angle of viewing, with a determined color, and for a determined duration. To obtain an effect of animation, several masks 15 are created upon which the size, translation, or rotation of the windows 16 evolves in a continuous manner, with the optical effects corresponding to the zones of the substrate 8 uncovered by the windows 16 of the masks 15, likewise evolving in a continuous manner, be it in terms of spatial frequency, angular orientation, or spatial frequency and angular orientation simultaneously. The masks 15 shown in FIGS. 6A through 6H satisfy this criterion.

In the desired image 9 shown in FIG. 2, the zones with an animation effect and the photograph have been partially superimposed. However, these different zones may be separate. Zone 11 with the micro-lettering may likewise be located in the flat tints 12, the photograph 10, or the zone 13 which has the elliptical lines 14.

By the same token, the zone of animation 13 may overlap the flat tints 12.

Figure 7:
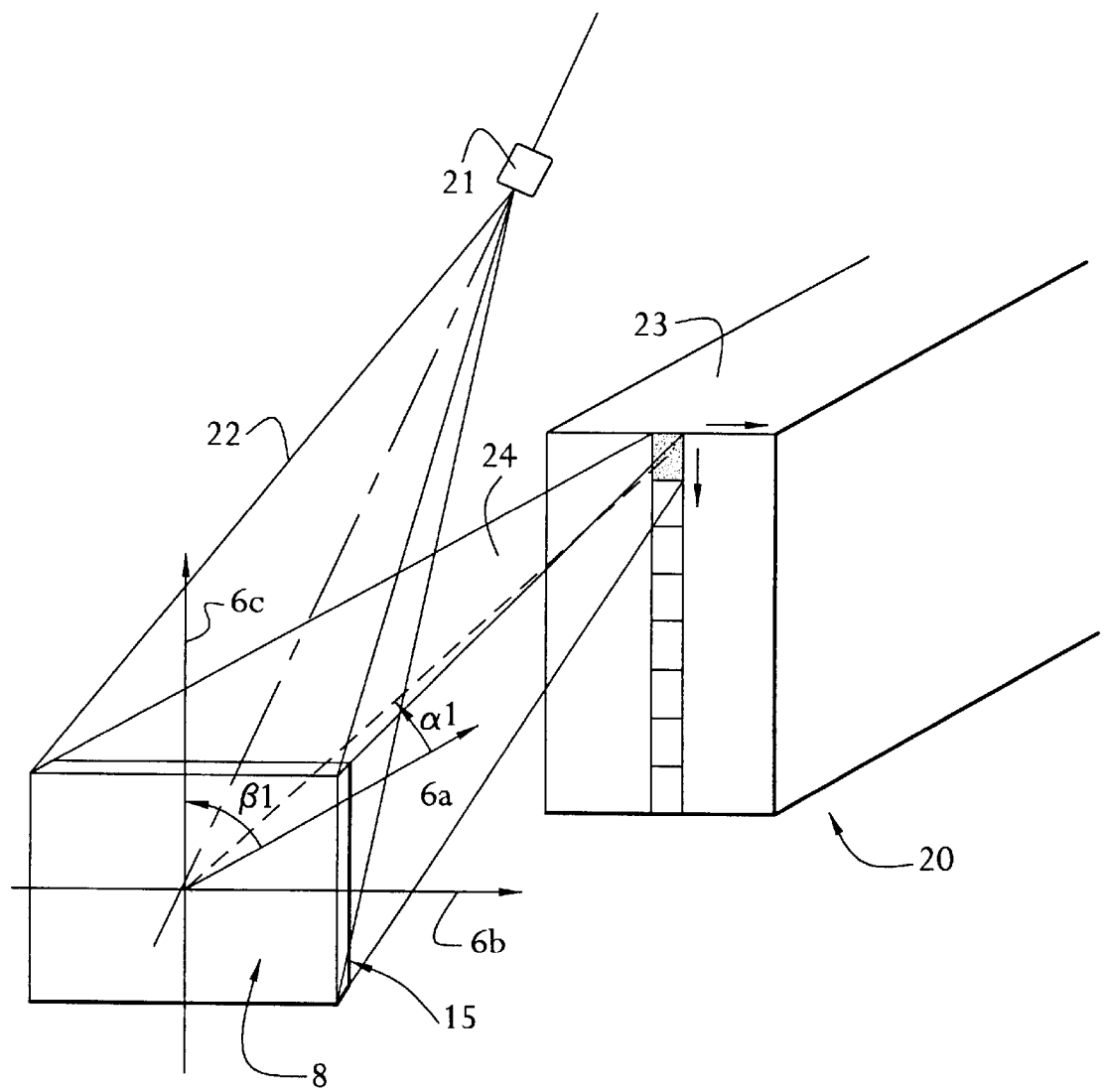
FIG. 7 shows a schematic diagram of the apparatus by which the process is implemented.

FIG. 7 shows a schematic representation of the device 20 used to impress the substrate by insolation according to the process of the invention. This device comprises a first optical system 21 which emits a first punctiform bundle of light 22 capable of illuminating the entire surface of substrate 8, and a second optical system 23 which emits a second bundle of light 24, likewise capable of illuminating the entire surface of the substrate 8. The two bundles of light 22 and 24 are mutually coherent and issue from the same laser.

The second bundle of light 24 issues from the rectangular illuminating surface whose every illuminating element illuminates the entire surface of the substrate 2.

A mask 15 is located above the substrate 8 and inside the field of the two bundles of light 22 and 24. The two bundles of light 22 and 24 interfere with each other, and depending on the position of each of the two optical systems 21 and 23 relative to the substrate 8, one obtains, in the plane of the substrate 8, an interferential grid defined by a spatial frequency, that is, the distance between the striations, and by an angular orientation.

The masks 15 all have the same dimensions, and those dimensions are such that the masks cover the surface of the substrate 8 entirely. During the course of one insolation, only those zones of the substrate 8 which are located facing the windows 16 of the mask 15 are able to receive an impression.

According to the process of the invention, each of the created masks 15 is placed one by one above the substrate 8, and the substrate 8 is insolated, taking care that the optical systems 21 and 23 are correctly positioned as a function of the desired optical effect for the insolated zones with the aid of said mask 15.

In order to accomplish the image 9 shown in FIG. 2 on the substrate 8, the substrate 8 is insolated while masking it successively with the 13 masks shown in the FIGS. 3A through 6H.

To accomplish the animation of the preceding example and create the impression that the ovals are growing or shrinking when the document 1 is moved to and fro around the axis 6b, one defines a direction for the first bundle of light 22 making it possible to obtain a determined color, and one varies the angles of incidence of the rays in the second bundle of light 24.

Figure 8:
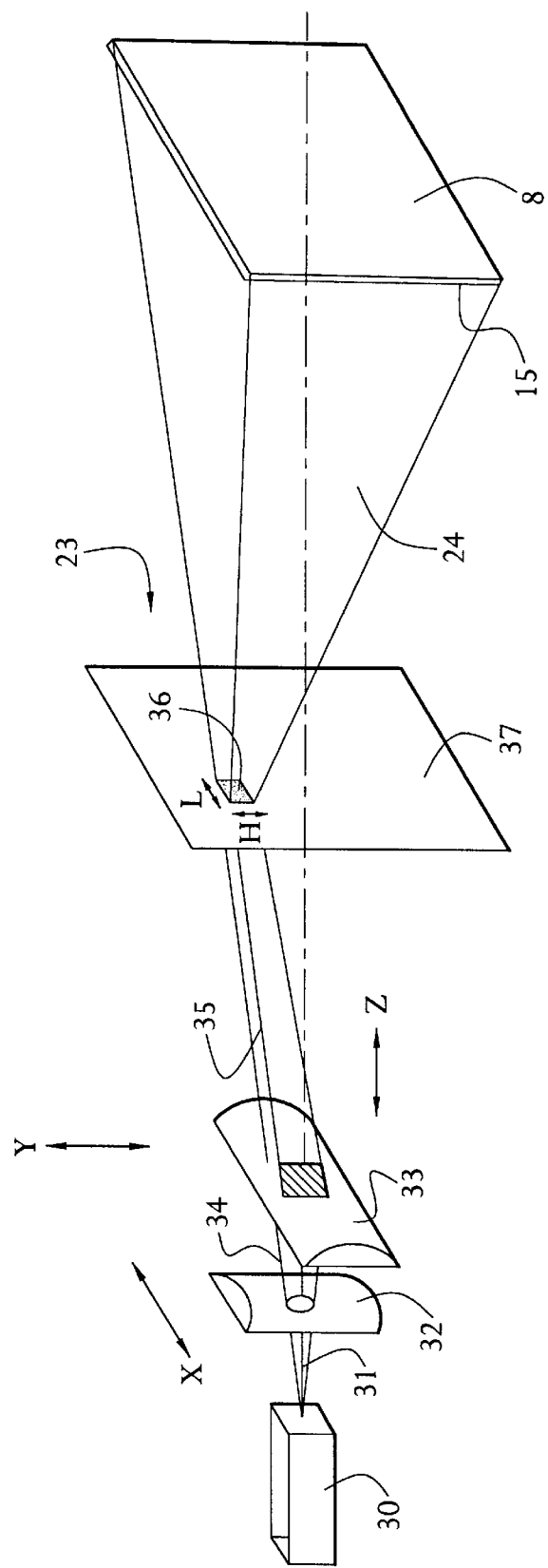
FIG. 8 shows an optical system of the apparatus in FIG. 7.

FIG. 8 shows a mode of implementing the second optical system 23. This second optical system 23 includes a device 30 which is located downstream from a laser and which emits a beam of light 31 diverging toward the substrate 8. A first cylindrical lens 32 is located in the field of the beam of light 31. A second cylindrical lens 33, perpendicular to the first lens 32, is located in the field of the bundle of light 34 exiting the first lens 32. The bundle of light 35 exiting the second lens 33 illuminates a rectangular zone 36 of a holographic optical element 37, which emits the second beam of light 24 toward the substrate 8. The position of the illuminated zone 36, and thus the values of the angles of incidence of the second bundle of light 34, is a function of the transverse positions of the cylindrical lenses 32 and 33 in the beam of light 31. The position of these two lenses 32 and 33 is transversely adjustable, with the first lens 32 capable of being moved in the direction of the arrow X and the second lens 33 capable of being moved in the direction of the arrow Y. Displacement of the first lens 32 along axis X makes it possible to move the zone 36 horizontally, which determines the position on the chromatic scale and, thus, the color, while displacement of the second lens 33 along the Y axis makes it possible to move the zone 36 vertically, thereby defining the angle at which the elemental image corresponding to the mask will appear and, thus, the moment at which that elemental image appears. The latter makes it possible to define the angle of observation of the element inscribed on the substrate.

The dimensions of the zone 36 are likewise adjustable by axial displacement of the lenses 32 and 33. Displacement of the first lens 32 along axis Z allows the width L of the zone 36 to be adjusted, thereby determining the passing color band. To modulate the range of color, it suffices to increase L and subsequently mask the unused spectral bands. Displacement of the second lens 33 along axis Z allows the height H of the illuminated zone 36 to be adjusted. The height H defines the duration of the appearance of an element of the image.

The holographic optical element 37 may be replaced by a set of divergent lenses arranged in rows and columns on a plane perpendicular to axis Z, whereby the lenses, when they receive the light issuing from the second lens 33, transmit that light onto the entire surface of the substrate 8. Each lens corresponds to one determined color and one determined angle of observation of the elemental image which will be perceived by the observer, and defines the duration of that elemental image's appearance when the observer moves the document to and fro.

We claim:

1. A substrate having an optically variable image, wherein, when the substrate is illuminated by a source of non-monochromatic light and rotated about a first axis, the optically variable image changes color, and, when the substrate is illuminated by the source of non-monochromatic light and rotated about a second axis different from and non-parallel to the first axis, the optically variable image changes shape.

2. The substrate of claim 1, wherein the first and second axes are substantially mutually perpendicular with both axes lying substantially in the plane of the substrate.

3. A method for generating a substrate having an optically variable image, comprising the steps of:
   (a) simultaneously illuminating the substrate with a first beam of light and a second beam of light, both of which have passed through a first mask corresponding to a first subset of the optically variable image; and
   (b) repeating step (a) one or more times, each time using a different mask corresponding to a different subset of the optically variable image, wherein, each time, the second beam of light has a different orientation with respect to the substrate, and two or more of the masks correspond to subsets of the optically variable image having different colors.

4. The method of claim 3, wherein the first and second beams of light are mutually coherent.

5. The method of claim 4, wherein the first and second beams of light originate from a single laser.

6. The method of claim 3, wherein the second beam of light is issued from a rectangular illuminating surface having a plurality of illuminating elements, each element adapted to illuminate the entire surface of the substrate.

7. The method of claim 3, wherein the second beam of light is issued from a set of divergent lenses arranged in rows and columns on a plane approximately perpendicular to the second beam of light.

8. The method of claim 3, wherein two or more of the masks correspond to subsets of the optically variable image having different durations.

9. The method of claim 3, wherein two or more of the masks correspond to subsets of the optically variable image having different shapes.

10. The method of claim 3, wherein the second beam of light is generated by passing a beam of light through a series of (1) a first transversely adjustable cylindrical lens, (2) a second transversely adjustable cylindrical lens, oriented approximately perpendicular to the first cylindrical lens, and (3) a holographic optical element having a plurality of zones, wherein each zone corresponds to a different orientation of the second beam of light with respect to the substrate, and a zone of the holographic optical element is selected by adjusting one or both of the first and second cylindrical lenses.

11. The method of claim 10, wherein adjusting one or more of the first and second cylindrical lenses changes the color of the subset of the optically variable image.

12. The method of claim 10, wherein adjusting one or more of the first and second cylindrical lenses changes the shape of the subset of the optically variable image.

13. The method of claim 10, wherein adjusting one or more of the first and second cylindrical lenses changes the duration of the subset of the optically variable image.

14. The method of claim 10, wherein the first and second cylindrical lenses are adjustable by axial displacement.

15. The method of claim 3, wherein neither beam of light passes through a diffusion plate.

16. A substrate having an optically variable image, generated by the method of claim 3.

17. The substrate of claim 16, wherein, when the substrate is illuminated by a source of non-monochromatic light and rotated about a first axis, the optically variable image changes color.

18. The substrate of claim 17, wherein, when the substrate is illuminated by the source of non-monochromatic light and rotated about a second axis different from the first axis, the optically variable image changes shape.

19. The substrate of claim 18, wherein the first and second axes are substantially mutually perpendicular and selected from the group consisting of (1) both axes lying substantially in the plane of the substrate and (2) one axis lying substantially in the plane of the substrate and the other axis substantially perpendicular to the substrate.

20. An apparatus for generating a substrate having an optically variable image, comprising:
   (a) means for simultaneously illuminating the substrate with a first beam of light and a second beam of light, both of which have passed through a first mask corresponding to a first subset of the optically variable image; and
   (b) means for repeating the processing of means (a) one or more times, each time using a different mask corresponding to a different subset of the optically variable image, wherein, each time, the second beam of light has a different orientation with respect to the substrate, and two or more of the masks correspond to subsets of the optically variable image having different colors.

21. An apparatus for generating a substrate having an optically variable image, comprising:
   (a) a first source of a first beam of light; and
   (b) a second source of a second beam of light, wherein the first and second beams of light are both adapted to (1) pass simultaneously through one of a sequence of masks, each mask corresponding to a different subset of the optically variable image, and (2) illuminate the substrate, each time using a different mask and the second beam of light having a different orientation with respect to the substrate, and two or more of the masks correspond to subsets of the optically variable image having different colors.

22. The apparatus of claim 21, wherein the first and second beams of light are mutually coherent.

23. The apparatus of claim 22, wherein the first and second sources comprise a single laser.

24. The apparatus of claim 21, further comprising a rectangular illuminating surface, adapted to pass the second beam of light and having a plurality of illuminating elements, each element adapted to illuminate the entire surface of the substrate.

25. The apparatus of claim 21, further comprising a set of divergent lenses arranged in rows and columns on a plane approximately perpendicular to the second beam of light and adapted to pass the second beam of light.

26. The apparatus of claim 21, wherein two or more of the masks correspond to subsets of the optically variable image having different durations.

27. The apparatus of claim 21, wherein two or more of the masks correspond to subsets of the optically variable image having different shapes.

28. The apparatus of claim 21, wherein the second source comprises a series of:

(1) a first transversely adjustable cylindrical lens;

(2) a second transversely adjustable cylindrical lens, oriented approximately perpendicular to the first cylindrical lens; and (3) a holographic optical element having a plurality of zones, wherein each zone corresponds to a different orientation of the second beam of light with respect to the substrate, and a zone of the holographic optical element is selected by adjusting one or both of the first and second cylindrical lenses.

29. The apparatus of claim 28, wherein adjusting one or more of the first and second cylindrical lenses changes the color of the subset of the optically variable image.

30. The apparatus of claim 28, wherein adjusting one or more of the first and second cylindrical lenses changes the shape of the subset of the optically variable image.

31. The apparatus of claim 28, wherein adjusting one or more of the first and second cylindrical lenses changes the duration of the subset of the optically variable image.

32. The apparatus of claim 28, wherein the first and second cylindrical lenses are adjustable by axial displacement.

33. The apparatus of claim 21, wherein neither beam of light passes through a diffusion plate.

34. A substrate having an optically variable image, generated by operating the apparatus of claim 21.

35. The substrate of claim 34, wherein, when the substrate is illuminated by a source of non-monochromatic light and rotated about a first axis, the optically variable image changes color.

36. The substrate of claim 35, wherein, when the substrate is illuminated by the source of non-monochromatic light and rotated about a second axis different from the first axis, the optically variable image changes shape.

37. The substrate of claim 36, wherein the first and second axes are substantially mutually perpendicular and selected from the group consisting of (1) both axes lying substantially in the plane of the substrate and (2) one axis lying substantially in the plane of the substrate and the other axis substantially perpendicular to the substrate.

38. The substrate of claim 1, wherein the first and second axes are substantially mutually perpendicular with one axis lying substantially in the plane of the substrate and the other axis substantially perpendicular to the substrate.

* * * * *